United States Patent
Lush

(10) Patent No.: US 6,426,312 B1
(45) Date of Patent: Jul. 30, 2002

(54) AIR PURIFYING MATRIX FOR THE OXIDATION OF AIR-BORNE PARTICULATE AND GASES

(76) Inventor: Donald Lawrence Lush, 18201 Centerville Creek Road, Caledon East, Ontario (CA), L0N 1E0

( * ) Notice: Subject to any disclaimer, the term of this patent is extended or adjusted under 35 U.S.C. 154(b) by 121 days.

(21) Appl. No.: 09/664,038

(22) Filed: Sep. 18, 2000

(51) Int. Cl.⁷ .............................. B01J 21/16; B01J 21/06
(52) U.S. Cl. ........................ 502/84; 502/80; 502/350; 502/340; 502/343; 502/305; 502/352; 502/215; 502/216
(58) Field of Search ..................... 502/80, 84, 350, 502/340, 343, 305, 352, 215, 216

(56) References Cited

U.S. PATENT DOCUMENTS

| | | | |
|---|---|---|---|
| 4,892,712 A | 1/1990 | Robertson et al. | 422/186 |
| 4,966,759 A | 10/1990 | Robertson et al. | 422/186 |
| 5,264,404 A | * 11/1993 | Takahama et al. | 502/84 |
| 5,468,699 A | 11/1995 | Zhang et al. | 502/60 |
| 5,516,492 A | 5/1996 | Dong et al. | 422/186 |
| 5,616,532 A | 4/1997 | Heller et al. | 502/242 |
| 5,736,055 A | 4/1998 | Cooper | 210/748 |
| 5,778,664 A | 7/1998 | Janata et al. | 60/274 |
| 5,779,912 A | 7/1998 | Gonsalez-Martin et al. | 210/748 |
| 5,790,934 A | 8/1998 | Say et al. | 422/186 |
| 5,862,449 A | 1/1999 | Bischoff et al. | 422/186.3 |

* cited by examiner

Primary Examiner—Steven P. Griffin
Assistant Examiner—Christina Ildebrando
(74) Attorney, Agent, or Firm—Hodgson Russ LLP

(57) ABSTRACT

The present invention is an air purifying matrix to remove, reduce or detoxify organic pollutants. The matrix has an inert substrate, a photoreactive semiconductor material, and aqueous particles. The inert substrate is water absorbent, transparent to ultraviolet light, able to withstand extended periods of exposure to all wavelengths of ultraviolet light side of the spectrum without decomposing or altering the structure thereof, able to withstand high concentrations of hydroxyl radicals without decomposing or altering the structure thereof, and in the form of an expanded granular type with spaces therein. The photoreactive semiconductor material is crystallized within the spaces. And the aqueous particles are within the spaces to form photoreactive metal semiconductor material nano-reactors within the matrix. These nano-reactors generate high concentrations of hydroxyl radicals which surround and diffuse through the matrix, and remove, reduce or detoxify organic pollutants within and surrounding the matrix. Moreover, the ultraviolet light is at a wavelength which the semiconductor material photoreacts.

9 Claims, No Drawings

AIR PURIFYING MATRIX FOR THE OXIDATION OF AIR-BORNE PARTICULATE AND GASES

FIELD OF THE INVENTION

This invention relates to the purification of air-borne particulates and gasses, in particular volatile organic compounds.

BACKGROUND OF THE PRESENT INVENTION

It has been known for some time that titanium dioxide can achieve photodechlorination of PCB'S, as described by J. H. Carey et al in "Photodechlorination of PCB's in the Presence of Titanium Dioxide in Aqueous Suspensions," "Bulletin of Environmental Contamination & Toxicology," Vol. 16, No. 6, pp. 697–701, 1976 Springer-Verlag New York Inc. Carey et al describe irradiation by ultra violet light with a wavelength of 365 nm of a 25 ppb aqueous solution of Aroclor 1254 in the presence of suspended particulate titanium dioxide. After 30 minutes no unreacted Aroclor could be detected in solution or adsorbed on the surface of the $TiO_2$. Similar experiments were conducted with other PCB's and resulted in an observed disappearance of the chlorinated biphenyls and the production of chloride ions. It has been reported the conversion (often called "mineralization") of a number of organic compounds to carbon dioxide by exposure to near ultra violet light in aqueous suspensions of anatase, a form of crystalline titanium dioxide. The solutes studied were benzene, benzoic acid, benzoate ion, salicylate ion, phenol, chlorobenzene, aniline, anilinium ion, nitrobenzene, chloroform and formic acid. Also it had been earlier reported that similar results with benzoic acid or sodium benzoate ("Hydroxylation Reactions Induced by Near-Ultraviolet Photolysis of Aqueous Titanium Dioxide Suspensions," J. Chem. Soc. Faraday Trans. 1, 1984, 80, pp 457–471).

Chen-Yung Hsiao et al. have also reported the mineralization of chloromethanes to $CO_2$ and HCl by the heterogeneous photocatalyst $TiO_2$ ("Heterogeneous Photocatalysis: Degradation of Dilute Solutions of Dichloromethane ($CH_2 Cl_2$), Chloroform ($CHCl_3$), and Carbon Tetrachloride ($CCl_4$) with Illuminated $TiO_2$ Photocatalyst," Journal of Catalysis 82, 1983, pp 418–423). Similar reactions have not been limited to $TiO_2$. Other metal semiconductors, such as ZnO, CdS, $WO_3$ and $SnO_2$, have been utilized in photocatalytic processes for the degradation of environmental contaminants ("Photocatalysis Over $TiO_2$ Supported On A Glass Substrate," by N. Serpone et al, Solar Energy Materials 14(1986) pp 121–127, Elsevier Science Publishers B.V.-North-Holland Physics Publishing Divisions, Amsterdam).

Robertson et al. in U.S. Pat. No. 4,966,759 disclose and claim a matrix for use in a method of removing, reducing or detoxifying organic pollutants from a fluid. The matrix is a substrate in the form of a plurality of layers of a filamentous, fibrous or stranded base material, and a photoreactive metal semiconductor material bonded with, to or into surfaces of the layers. And at least one of the layers being at least partially transparent to light at a wavelength to which the semiconductor material photoreacts. The filamentous, fibrous or stranded base material disclosed by Robertson et al. are fiberglass, glass wool, and steel.

The filamentous, fibrous or stranded base materials of glass wool and fiberglass, as found by the present applicant, were unable to withstand extended periods in ultraviolet light without altering the adherence of the anatase to the base material. Similarly, steel is unable to withstand extended periods of exposure to hydroxyl compounds without rusting. Also, these base materials are not water absorbent because an object of Robertson et al.'s invention was to use a base material for the water to flow through or on it, not be trapped within. (First paragraph of the Detailed Description of the Invention.) Hence, water is not trapped in the material, which is an embodiment of the present invention in order to upon reaction with UV light and anatase form hydroxyl radicals, which create undesirable effect on the steel substrate which is discussed above.

SUMMARY OF THE INVENTION

The present invention solves these problems of the prior art. This invention is an air purifying matrix to remove, reduce or detoxify organic pollutants. The matrix has an inert substrate, a photoreactive semiconductor material, and aqueous particles. The inert substrate is water absorbent, transparent to ultraviolet light, able to withstand extended periods of exposure to all wavelengths of ultraviolet light side of the spectrum without decomposing or altering the structure thereof, able to withstand high concentrations of hydroxyl radicals without decomposing or altering the structure thereof, and in the form of an expanded granular type with spaces therein. The photoreactive semiconductor material is crystallized within the spaces. And the aqueous particles are within the spaces to form photoreactive metal semiconductor material nano-reactors within the matrix. These nano-reactors generate high concentrations of hydroxyl radicals which surround and diffuse through the matrix, and remove, reduce or detoxify organic pollutants within and surrounding the matrix. Moreover, the ultraviolet light is at a wavelength which the semiconductor material photoreacts.

DETAILED DESCRIPTION OF THE PRESENT INVENTION

The present invention is an alternative embodiment of U.S. Pat. No. 4,966,759, which is hereby incorporated by reference herein. The '759 patent uses and discloses base materials that are filamentous, fibrous or stranded. Such materials do not by design retain water. As such, the invention disclosed in the '759 patent is unable to obtain the desired results, formation of hydroxyl compounds, in a non-aqueous environment. The term "non-aqueous environment" means that water does not continuously or intermittently pass through the present invention; instead "non-aqueous environment" includes water particles being trapped in the present invention.

The present invention is designed to work in a non-aqueous environment and formulate hydroxyl compounds in such an environment. The base materials cited in the '759 patent are described as "any other assembly that is sufficiently transparent to the light can be used. Such an assembly can achieve its transparency either from its structure, e.g. a very open mesh, or from its own intrinsic property. For example, a material like stainless steel that is itself opaque to the light can be used, provided it has a sufficiently open structural form, i.e. the substrate as a whole is sufficiently transparent. What constitutes sufficient transparency of the substrate will depend on how many layers (convolutions) are superposed on one another. While the use of other materials is not precluded, fiberglass will normally be the preferred choice among currently available materials from the viewpoints of cheapness, light weight, convenience of handling, relatively high transparency and its inertness to the reactants." Those cited materials, however, do not trap moisture within the base material.

Instead of a filamentous, fibrous or stranded base material, the present invention relies on naturally-formed micaceous structure, which is not filamentous, fibrous or stranded. A micaceous structure, as defined in this application, is a base material that expands, allows UV light to penetrate through it, receives photoreactive metal semiconductor material into interlamellar spaces formed when the base material expands and absorbs water into the interlamellar spaces. Examples of such material includes expanding clays like bentonite or those materials selected from the group having aluminum silicate minerals which is common in igneous and metamorphic rocks, and characteristically splitting into flexible sheets. Preferably, the micaceous structure is vermiculite, a group of minerals that are hydrous silicates, derived generally from the alteration of some kind of mica because the scales, when heated, open out into expanded sheet forms. The vermiculite used in the present invention is transparent to allow UV light to penetrate within.

The preferred method of bonding anatase or an anatase doped with trace elements such as copper, Zn, Pd Pt or other materials to improve its efficiency to the micaceous structure, vermiculite, is as follows:

1. At room temperature, Titanium (IV) ethoxide was mixed with EtOH at a 1:10 ratio, which generated white precipitate.
2. Concentrated $HNO_3$ was slowly added until the precipitate dissolved.
3. Expanded vermiculite was soaked in the solution over a period of time typically overnight in order to allow all or a significant portion of the interlamellar spaces to become saturated with the titanium ethoxide in the acidic alcohol solution.
4. The suspension was then filtered to separate the saturated vermiculite particles from any remaining alcohol solution.
5. The vermiculite was dried in air for 6 hours and then heated in a furnace at 400° C. for one hour.

While the foregoing process has been found effective, many variations are possible. In particular, it has been found that the crystallization temperature can be varied to generate crystals of different characteristics, for example, crystal size and resulting surface area. Therefore, a range of temperatures can be used to obtain the desired characteristics.

The applicant conducted tests in its Amaircare model 2000 that had an air flow of approximately 50 $ft^3$/minute air flow and a detector that measured the volatile organic compounds, after the air flowed through the Amaircare unit.

1. As a control, a volatile organic compound ("VOC") vapor was introduced into the Amaircare model 2000 as a single depleting slug. The initial concentration of the VOCs was approximately 4 ppm. The concentration of the VOCs leaving the device was measured at 4 ppm dropping to zero ppm after a period of approximately one minute.
2. The same experiment was conducted with a UV light turned on. Again, the starting source concentration was approximately 4 ppm. In this case there was not a significant difference from the control with concentrations of VOCs not significantly affected.
3. The next experiment involved placing approximately 10 g of the treated vermiculite material containing only hydroscopic water taken up from the ambient environment on the layer of HEPA material in the bottom of the Amaircare model 2000 cleaning device. After introducing a single depleting slug, the initial concentration of the VOCs was approximately 5 ppm. The highest measured concentration of the VOCs leaving the device was 1 ppm dropping rapidly to zero ppm.
4. This experiment was the same as experiment 3, except the treated vermiculite was dampened, not soaked or in an aqueous environment. In this experiment, no VOCs were detected coming through the device.

As illustrated, this invention works extremely well in a non-aqueous environment, and does so due to the micaceous structure of the base material.

It is intended that the above description of the preferred embodiments of the structure of the present invention and the description of its operation are but one or more enabling best mode embodiments for implementing the invention. Other modifications and variations are likely to be conceived of by those skilled in the art upon a reading of the preferred embodiments and a consideration of the appended claims and drawings. These modifications and variations still fall within the breadth and scope of the disclosure of the present invention.

What is claimed is:

1. An air purifying matrix to remove, reduce, or detoxify organic pollutants comprising:

an inert, micaceous structure having an expanded granular form with spaces therein, a photoreactive metal semiconductor material crystallized within the spaces, and aqueous particles within the spaces to form photoreactive semiconductor material nano-reactors within the air purifying matrix which generate high concentrations of hydroxyl radicals which surround and diffuse through the air purifying matrix, and remove, reduce or detoxify organic pollutants within and surrounding the air purifying matrix.

2. The air purifying matrix of claim 1 wherein the inert, micaceous structure is vermiculate.

3. The air purifying matrix of claim 1 wherein the photoreactive material is anatase.

4. The air purifying matrix of claim 1 wherein the photoreactive material is selected from CdS, CdSe, $ZnO_2$, $WO_3$, and $SnO_2$.

5. The air purifying matrix of claim 1 wherein the inert, micaceous structure is an expanding clay.

6. The air purifying matrix of claim 1 wherein the inert, micaceous structure is an aluminum silicate material.

7. The air purifying matrix of claim 1 wherein the air purifying matrix is inserted into an air purifying machine.

8. The air purifying matrix of claim 7 wherein the aqueous particles are added to the air purifying matrix after being inserted into the air purifying machine.

9. The air purifying matrix of claim 7 wherein the air purifying matrix in conjunction with the air purifying machine, reduces the organic pollutants within and surrounding the air purifying matrix.

* * * * *

UNITED STATES PATENT AND TRADEMARK OFFICE
CERTIFICATE OF CORRECTION

PATENT NO.     : 6,426,312 B1
DATED          : July 30, 2002
INVENTOR(S)    : Lush It is certified that error appears in the above-identified patent and that said Letters Patent is hereby corrected as shown below:

<u>Title page, Item [54] and Column 1, lines 2 and 3,</u>
"PARTICULATE" should be -- PARTICULATES --
"GASES" should be -- GASSES --

Signed and Sealed this

Twenty-eighth Day of January, 2003

JAMES E. ROGAN
*Director of the United States Patent and Trademark Office*